United States Patent [19]
Kablau et al.

[11] Patent Number: 5,587,980
[45] Date of Patent: Dec. 24, 1996

[54] METHOD DERIVING A QUALITY SIGNAL FROM A READ SIGNAL, AND READING AND RECORDING DEVICES WHICH EMPLOY THAT METHOD

[75] Inventors: Johannes G. F. Kablau; Winslow M. Mimnagh; Petrus C. J. Hoeven, all of Eindhoven, Netherlands

[73] Assignee: U.S. Philips Corporation, New York, N.Y.

[21] Appl. No.: 219,321

[22] Filed: Mar. 29, 1994

[30] Foreign Application Priority Data

Apr. 22, 1993 [BE] Belgium ............................ 09300398

[51] Int. Cl.$^6$ .................................................. G11B 7/00
[52] U.S. Cl. ............................ 369/54; 369/58; 369/59
[58] Field of Search ........................ 369/48, 58, 47, 369/54, 124, 116, 59, 60, 32

[56] References Cited

U.S. PATENT DOCUMENTS

| | | | |
|---|---|---|---|
| 4,646,103 | 2/1987 | Sugiyama et al. | 346/1.1 |
| 4,774,522 | 9/1988 | Van Tongeren et al. | 346/1.1 |
| 5,001,692 | 3/1991 | Farla et al. | 369/48 |
| 5,128,921 | 7/1992 | Van et al. | 369/116 |
| 5,226,027 | 7/1993 | Bakx | 369/116 |
| 5,241,524 | 8/1993 | Lee | 369/54 |
| 5,303,217 | 4/1994 | Bakx et al. | 369/116 |
| 5,305,297 | 4/1994 | Nishiuchi et al. | 369/54 |
| 5,327,411 | 7/1994 | Iwasu et al. | 369/54 |
| 5,327,414 | 7/1994 | Makino et al. | 369/116 |
| 5,353,270 | 10/1994 | Iimura | 369/116 |
| 5,414,689 | 5/1995 | Maeda et al. | 369/59 |
| 5,418,770 | 5/1995 | Ide et al. | 369/116 |

FOREIGN PATENT DOCUMENTS

| | | |
|---|---|---|
| 0288114 | 10/1988 | European Pat. Off. . |
| 0317193 | 5/1989 | European Pat. Off. . |
| 0404251 | 12/1990 | European Pat. Off. . |
| 3727681 | 3/1988 | Germany . |
| 2109187 | 5/1983 | United Kingdom . |

*Primary Examiner*—Nabil Hindi
*Attorney, Agent, or Firm*—Richard A. Weiss

[57] ABSTRACT

Method of deriving a quality signal for a binary read signal having bit cells of constant length, and reading and recording devices which employ that method. During a reading process, an information pattern of optically detectable effects, representing certain of the bit cells, is scanned. A read signal is generated therefrom in which first read signal portions that exceed a reference value correspond to the effects. The quality signal is derived (in an analysis circuit) from the first read signal portions based on a measure of the deviation of first read signal portions corresponding to a particular length or mutual differences between length deviation of first read signal portions of different lengths. The quality signal can be used for adapting a recording strategy used in the recording of information, or for setting an equalizing filter. In the latter, in dependence on the quality signal, the ratio of the filter is set between a gain factor in a certain frequency range in the frequency band of the filter and a gain factor outside that frequency range.

25 Claims, 7 Drawing Sheets

| CO | Q5 | Q4 | Q3 | Q2 | Q1 | n |
|----|----|----|----|----|----|----|
| 0  | 0  | 0  | 0  | 0  | 0  |   |
| 1  | 0  | 0  | 0  | 0  | 1  |   |
| 2  | 0  | 0  | 0  | 1  | 0  |   |
| 3  | 0  | 0  | 0  | 1  | 1  |   |
| 4  | 0  | 0  | 1  | 0  | 0  |   |
| 5  | 0  | 0  | 1  | 0  | 1  | 3 |
| 6  | 0  | 0  | 1  | 1  | 0  |   |
| 7  | 0  | 0  | 1  | 1  | 1  | 4 |
| 8  | 0  | 1  | 0  | 0  | 0  |   |
| 9  | 0  | 1  | 0  | 0  | 1  | 5 |
| 10 | 0  | 1  | 0  | 1  | 0  |   |
| 11 | 0  | 1  | 0  | 1  | 1  | 6 |
| 12 | 0  | 1  | 1  | 0  | 0  |   |
| 13 | 0  | 1  | 1  | 0  | 1  | 7 |
| 14 | 0  | 1  | 1  | 1  | 0  |   |
| 15 | 0  | 1  | 1  | 1  | 1  | 8 |
| 16 | 1  | 0  | 0  | 0  | 0  |   |
| 17 | 1  | 0  | 0  | 0  | 1  | 9 |
| 18 | 1  | 0  | 0  | 1  | 0  |   |
| 19 | 1  | 0  | 0  | 1  | 1  | 10 |
| 20 | 1  | 0  | 1  | 0  | 0  |   |
| 21 | 1  | 0  | 1  | 0  | 1  | 11 |

FIG.13

METHOD DERIVING A QUALITY SIGNAL FROM A READ SIGNAL, AND READING AND RECORDING DEVICES WHICH EMPLOY THAT METHOD

BACKGROUND OF THE INVENTION

The invention relates to a method of deriving a quality signal which is indicative of the quality of a read signal having constant-length bit cells, which bit cells have a first or second logic value, in which effects represent groups of successive bit cells having a first logic value. In accordance with that method, the read signal is obtained by scanning an information pattern of optically detectable effects, where first read signal portions exceeding a reference value in a first direction correspond to the effects in the read information pattern, and the quality signal is derived on the basis of first read signal portions. The invention further relates to a recording device and a reading device in which the method is used.

A method and reading device of the type described above is known from Research Disclosure, August 1992, No. 34002. That document describes a method of recording what is commonly referred to as EFM-modulated signals used in CD systems. For a reliable recovery of the information represented by the read signal, it is fundamental for the quality of the read signal to satisfy a certain standard. According to the quality standard described in previously mentioned document, the lengths of the first read signal portions in the signal that is read out are, in essence, to adopt discrete values which are equal to an integer number times the bit cell length. The quality signal indicates the extent to which this quality standard is satisfied. According to the known method, first read signal portions corresponding to a small number of bit cells, in this case three, are selected for deriving the quality signal. A signal is derived as the quality signal which is a measure of the jitter of these selected first read signal portions. If this quality signal indicates that the quality standard is not satisfied, a recording strategy is adapted, so that the information pattern and hence also the quality of the read signal is adapted. Recording strategy in this context is meant to be understood as the relationship between the recording beam modulation used for the recording, and the information to be recorded. In the prior-art device, a recording strategy is used according to which an effect having a length that corresponds to 3 bit cells (also termed I3 effect) is recorded by a radiation pulse 2 bit cells in length, the intensity in the last part of the radiation pulse being lower than the intensity at the beginning of the radiation pulse. Effects representing a larger number of bit cells are obtained by extending the radiation pulse, with the intensity in the extended part of the radiation pulse being kept low. If an adaptation of the recording strategy is desired, this adaptation is exclusively effected in the prior-art device by adapting the intensity at the beginning of the radiation pulses.

SUMMARY OF THE INVENTION

It is an object of the invention to provide a method in which a quality signal is generated that indicates the quality of the read signal better.

In terms of the method this object is achieved by a method, as defined in the opening paragraph, characterized in that, when the quality signal is derived, a measure is determined for the length deviation between the actual length of first read signal portions which represent groups of n successive bit cells and n times the bit cell length. A value is selected for n at which the sensitivity of the length deviation to certain parameter changes is relatively large in comparison with the sensitivity to the parameter changes of other first read signal portions.

By detecting the length deviations in those read signal portions that correspond to the effects whose length deviations are sensitive to changes in the recording strategy, it can be reliably established whether the correct recording strategy has been used.

An embodiment of the method is characterized in that, when the quality signal is derived, a second measure is determined for the length deviation of read signal portions which represent bit groups of m successive bit cells, with the quality signal is indicative of the difference between the first and second measures. A value is selected for m at which the sensitivity of the length deviation to the parameter changes is relatively small in comparison with the sensitivity of the length deviations of other first read signal portions.

Since this embodiment determines the mutual differences of the length deviations, changing parameters detrimentally affecting the determination of the length deviation have less detrimental consequences.

An embodiment of the method which is pre-eminently suitable for determining the quality of read CD signals is characterized in that n is equal to 3 and in m is greater than or equal to 5 and smaller than or equal to 7.

The method according to the invention is advantageously used in a recording device for recording in a recording layer a binary information signal having constant-length bit cells having a first or second logic value. The device comprise scanning unit for scanning the recording layer with a radiation beam, a modulation unit for modulating the intensity of the radiation beam in response to the information signal while a certain recording strategy is followed, as a result of which an information pattern of optically detectable effects is recorded in the recording layer, which effects represent groups of successive bit cells having the first logic value, a reading unit for optically reading the information pattern for which a read signal is generated in which first read signal portions exceeding a reference value in a first direction correspond to the effects in the read-out information pattern, an analysis unit for analysing first read signal portions and for producing a quality signal which is indicative of the result of the analysis made, and an adapting unit for adapting the recording strategy on the basis of the quality signal. The analysis unit comprises a deriving unit for deriving a measure of the length deviation between the actual length of first read signal portions which represent groups of n successive bit cells and n times the bit cell length, which quality signal is indicative of the measure and a value is selected for n at which the sensitivity of the length deviation to changes in the recording strategy is relatively large in comparison with the sensitivity of the write deviations of other first read signal portions.

A further embodiment of the recording device is characterized in that the modulation unit comprises a unit for performing a recording strategy according to which the intensity of the radiation beam is modulated in a pulsed manner, and the adapting units is arranged for adapting the intensity of the radiation pulses in a time interval situated a predetermined period of time past the beginning of each radiation pulse, and the device further comprises a setting unit for a reference value at which the average length of the first read signal portions is, in essence, equal to the average length of second read signal portions which are located between the first read signal portions in the signal that has been read out.

Since this embodiment utilizes a recording strategy according to which the intensity variation at the beginning of the radiation pulses is not adapted, the length of the short effects does not change, contrary to the length of the longer effects. As a result, the mutual ratios between the effects do change. Any asymmetry (the ratio of the average effect length to the average length of the areas between the effects is unequal to 1) in the recorded pattern which may be a result thereof is not a drawback, because the influence it has on the read signal may be suppressed by a shift of the reference value. It is essential that the mutual ratios between the effects of various lengths be such that the information can be recovered from the signal that has been read out.

Since in this embodiment the intensity at the beginning of the radiation pulse is not adapted, a similar control of the energy contents can be applied to differently set recording strategies of the radiation pulses.

An embodiment in which this has been realised is characterized in that the device comprises a detection unit for detecting the radiation reflected by the recording layer during recording, and a setting unit for setting the intensity level adopted by the radiation beam during the period of time at the beginning of each radiation pulse in dependence on the behaviour of the intensity of the reflected radiation during the intervals at the beginning of the radiation pulses.

The method according to the invention is also pre-eminently suitable for use in a reading device. The read signal can therein be suitably processed on the basis of the quality signal, so that the consequences of any occurring differences of length in the information pattern may be compensated for.

This is realised in a reading device for reading an information pattern from a recording layer, which information pattern represents a binary information signal having constant-length bit cells, which bit cells have a first or second logic value, the information pattern having optically detectable effects which represent groups of successive bit cells having the first logic value. The device comprises a reading unit for optically reading the information pattern, which reading unit reads out a signal whose first read signal portions exceeding a reference value in a first direction correspond to the effects in the read information signal, a filter unit for filtering the read signal in which filter means the ratio between the gain factor of read signal portions in a specific frequency range and read signal portions outside this frequency range can be an analysis unit for determining a quality signal that is a measure of the length deviation between the actual lengths of first read signal portions that represent groups of n successive bit cells and n times the bit cell length, and an adapting unit for adapting the ratio between the gain factors in dependence on the quality signal. A value is selected for n at which the frequency of the read signal portions of n times the bit cell length lies in said frequency range.

BRIEF DESCRIPTION OF THE DRAWINGS

The invention will be further explained with reference to the following drawings, in which

FIG. 3b shows a pattern of effects which corresponds to the information signal shown in FIG. 3a;

FIG. 4b shows an associated read signal for the pattern of effects shown in FIG. 4a;

FIG. 4c shows an associated binary read signal for the pattern of effects shown in FIG. 4a;

FIG. 13 shows a Table used in explaining the operation of the analysis circuit shown in FIG. 11;

DESCRIPTION OF THE PREFERRED EMBODIMENTS

The invention will be further explained hereinafter with reference to embodiments suitable for recording and reading so-called EFM-modulated signals as are used, for example, for recording CD signals. However, the field of application of the invention is not restricted to the recording and reading of EFM-modulated signals. The invention may likewise be applied to recording and reading other signals which comprise constant-length bit cells.

Figure 3A:
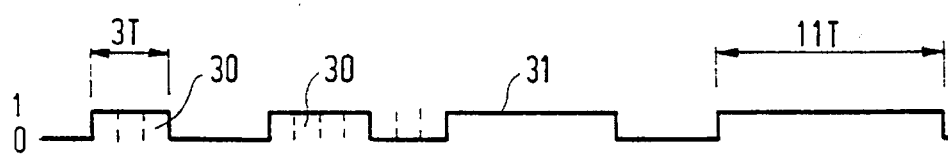
FIG. 3a shows an information signal.

By way of illustration FIG. 3a shows an EFM-modulated signal 31. The EFM-modulated signal 31 is a binary signal and comprises bit cells 30 having a constant length T. The minimum number of successive bit cells having an identical logic value is equal to 3 for an EFM-modulated signal, whereas the maximum number is equal to 11. Such a signal can be recorded on a record carrier which comprises a recording layer of a type in which an optically detectable change can be realised by subjecting the recording layer to radiation of a sufficiently high intensity. Such layers may be of a type in which the optically detectable changes result in changes of reflection. However, so-called magnet-optical layers in which an optically detectable change of the magnetization can be realised can also be used. The EFM-modulated signal 31 is recorded in the form of a pattern of effects 32 in which the optically detectable change has been realised, and which effects alternate with gaps 33 which have not undergone optically detectable changes.

Figure 3B:

In the pattern shown in FIG. 3b the effects 32 represent the bit cells having the logic "1" value, whereas the gaps 33 represent the bit cells having the logic "0" value. The lengths of the effects 32 and gaps 33 correspond to the number of bit cells they represent. The effects represented by a group of n bit cells will be referenced In-effects hereinafter for brevity.

The In-effects may be realised in a recording layer by scanning with constant velocity the recording layer with a radiation beam whose intensity, which corresponds to the signal to be recorded, is modulated while a suitable recording strategy is used.

Figure 2A:
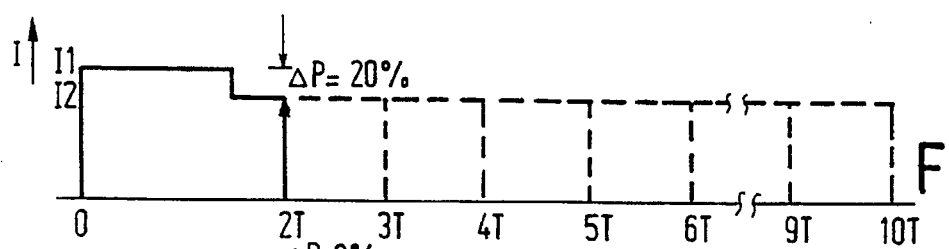
FIG. 2a–c show a plurality of different recording strategies.

The recording strategy is meant to be understood here as the relationship between the recording beam modulation used for the recording and the information to be recorded. By way of illustration FIG. 2a shows a suitable recording strategy. In accordance with this recording strategy a radiation pulse having a length (n−1).T is used for recording an ln-effect which represents a series of n bit cells, the intensity of the radiation pulse being set to the value I1 for a time interval of 1.5 T at the beginning of the radiation pulse. After this 1.5 T time interval the intensity I is set to a level of I2.

Figure 4A:
FIG. 4a shows a pattern of effects.
Figure 4B:
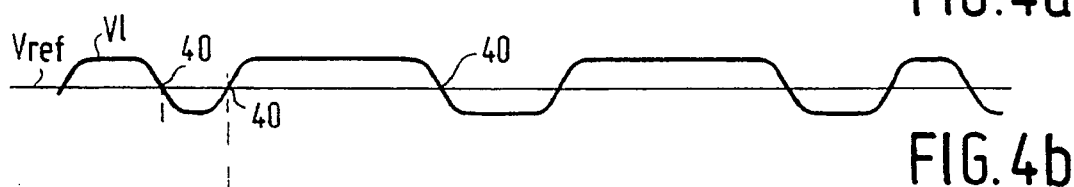
Figure 4C:
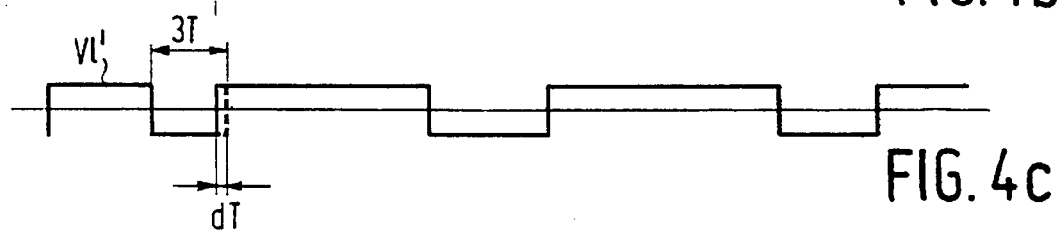

A recorded pattern of effects 32 may be read out by scanning the pattern with a radiation beam of constant intensity. The radiation reflected by the recording layer presents a modulation which corresponds to the scanned pattern. This modulation may be detected in a customary fashion and converted into a read signal. FIG. 4a shows by way of illustration a pattern of effects 32. FIG. 4b shows the corresponding read signal V1. Reference character 40 designates the transections of a reference level Vref by the read signal V1. A binary read signal V1' may be obtained by producing a signal value "1" if the signal value of the read signal V1 lies above the reference value and by producing a signal value "0" if the read signal lies below the reference value. The binary read signal V1' thus obtained is shown in FIG. 4c. For a reliable demodulation of the binary read signal V1' the lengths of the read signal components having the same logic value are desirably to correspond within accurate limits to an integer times the bit cell length T. Generally, these read signal components will not be exactly equal to an integer times the bit cell length, rather there will be a length deviation between the actual length and the optimum length. In FIG. 4c such a length deviation is referenced dT. These length deviations may be caused by asymmetry in the recorded pattern of effects 32 and gaps 33, i.e., the effect length will on average be too short in comparison with the gap length or vice versa. The influence of such asymmetry may be reduced by shifting the reference level Vref. An extremely simple setting of the reference level to a value at which any asymmetry hardly has any influence on the binary read signal may occur in so-called DC-free modulated signals, i.e., the number of bit cells having the logic "0" value is equal to the number of bit cells having the logic "1" value. In such DC-free modulated signals, to which class an EFM-modulated signal belongs, the reference level is set to a value at which the DC component in the read signal is, in essence, equal to 0.

Such a reduction of the influence of asymmetry by the adaptation of the reference level Vref operates well if the deviations dT for the different lengths of the effects do not differ too much. If there are large mutual differences of the deviation dT, the recording strategy has not been optimally adapted to the recording layer and, therefore, it is desired to adapt the recording strategy accordingly.

This adaptation can be made by changing the proportion between the energy contents of the radiation pulses for the effects of different lengths.

Figure 5:
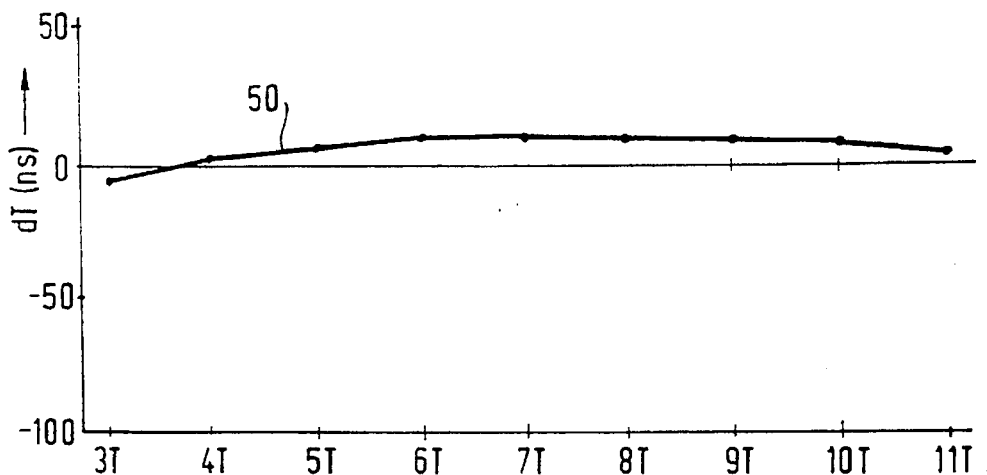
FIGS. 5, 6 and 7 show length deviations for different effect lengths for different recording strategies.
Figure 6:
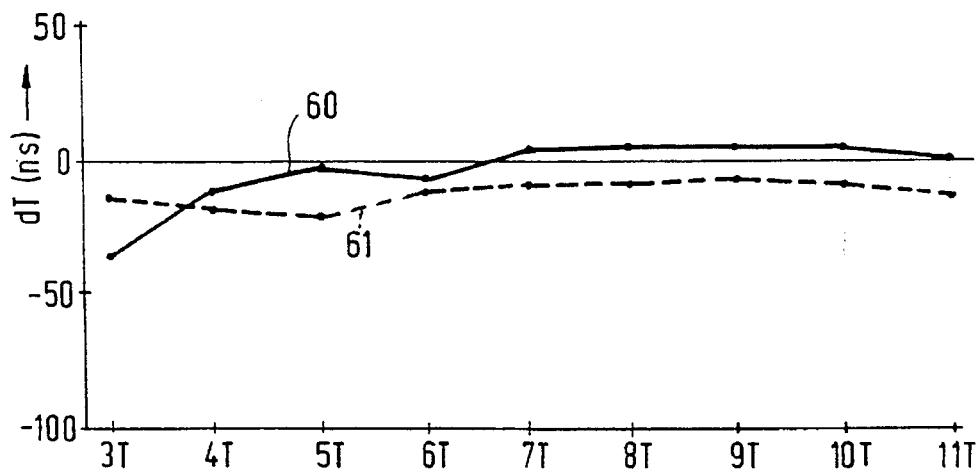
Figure 7:
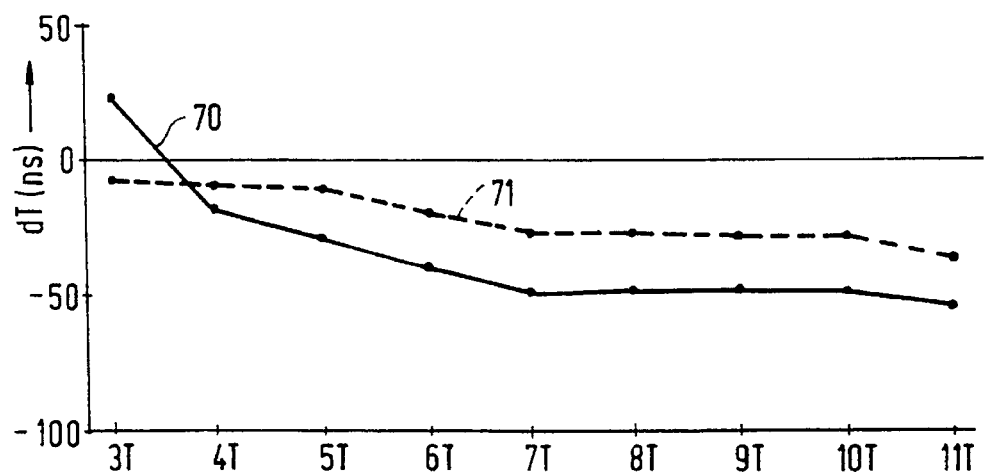

In the case where the parts of the read signal that correspond to the short effects are too short in comparison with the longer effects, this change may be carried out by adapting the recording strategy, so that the energy contents of the radiation pulse for recording short effects are increased, whereas the energy contents of the radiation pulses for recording the longer effects are kept substantially the same. As a result, the short effects will become longer in comparison with the longer effects. In the case where the short effects are too short in comparison with the longer effects, however, it is attractive to leave the energy contents of the radiation unchanged for recording short effects and to reduce the energy contents of the radiation pulses for recording longer pulses. Consequently, the length of the short effects remains the same. However, the length of the longer effects becomes smaller, so that the mutual differences between the length deviations dT of the various effects become smaller. Such an adaptation of a recording strategy, however, may result in slight asymmetry. As explained hereinbefore, the influence of such asymmetry on the binary read signal V1' may be reduced to substantially 0 by an adaptation of the reference level Vref. The correctness of the recording strategy used may be simply and reliably determined by detecting the length deviation of those read signal portions that correspond to effects whose length relatively strongly depends on the recording strategy used. In practice, especially the lengths of the short effects appear to depend strongly on the recording strategy used. By way of illustration FIGS. 5, 6 and 7 show the length deviation for read signal portions that correspond to effects for different numbers of successive bit cells having the same logic value.

The points on the curves 50, 60 and 70 designate the length deviations dT for three different types of recording layers in which effects have been recorded by implementation of the recording strategy shown in FIG. 2a. The mutual differences between the length deviations shown by the points on the curve 50 are small. This means that the recording strategy used has been sufficiently adapted to the recording layer.

The mutual differences between the length deviations situated on the curve 60 are large, however. The length deviation for the read signal portions having the length 3.T have a large negative value in comparison with the other length deviations. This denotes that the recording strategy used has not been adapted sufficiently to the recording layer. For causing the mutual differences in the length deviations to diminish, the recording strategy is to be changed. A suitable recording strategy is the one shown in FIG. 2c. With this recording strategy the intensity I2 is reduced in comparison with the original recording strategy as shown in FIG. 2a. This adaptation results in the longer effects being slightly shorter, whereas the length of the short effects remains substantially equal, so that the mutual differences between the length deviations become smaller. As observed hereinbefore, this may result in slight asymmetry, of the influence of which, however, can be counteracted by shifting the reference level Vref. To illustrate this, FIG. 6 shows in the curve 61 the length deviations for the case where the recording strategy shown in FIG. 2c is used.

The mutual differences between the length deviations situated on the curve 70 are also large. The length deviations for the read signal portions having the length 3.T have a large positive value in comparison with the other length deviations. This points out that the recording strategy used has not been adapted sufficiently to the recording layer.

Figure 2B:
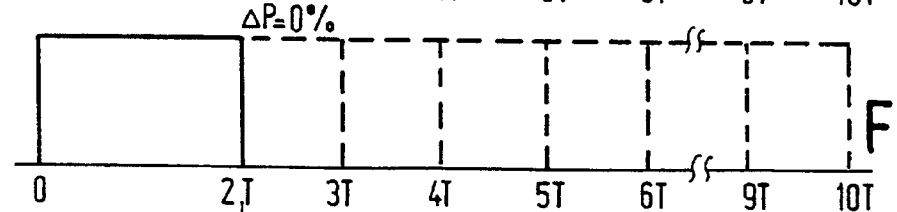
Figure 2C:
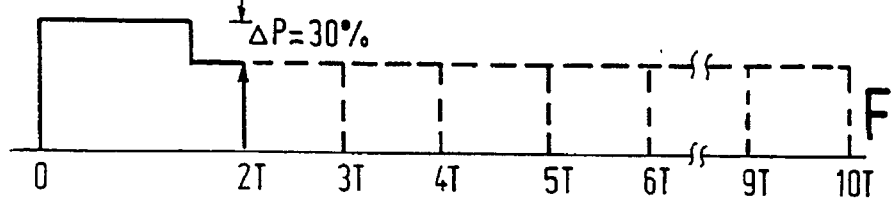

A better adapted recording strategy is the one shown in FIG. 2b. With this recording strategy the intensity I2 is increased in comparison with the original recording strategy as the one shown in FIG. 2a. This adaptation results in the longer effects become slightly longer, whereas the length of the short effects remains substantially equal, so that the mutual differences in the length deviations become smaller. As observed hereinbefore, this may lead to slight asymmetry, the influence of which can be counteracted, however, by shifting the reference level Vref. By way of illustration FIG. 7 shows in curve 71 the length deviations for the case where the recording strategy shown in FIG. 2b is used.

With the method according to the invention the correctness of the recording strategy used is determined by deriving a quality signal which denotes whether there are large mutual differences between the length deviations for effects having different lengths.

Depending on this measure the recording strategy is adapted or not. In an embodiment of the method according to the invention a test pattern of effects 32 is recorded with the recording strategy shown in FIG. 2a. Then a determination is made as to whether the length deviation of the I3 effect lies within certain margins which are determined by a specific minimum value and a specific maximum value. If the quality signal denotes that the extent of the length deviation lies below the minimum value, the recording strategy shown in FIG. 2c will be used from then on. If the quality signal denotes that the extent of the length deviation lies above the maximum value, the recording strategy shown in FIG. 2b will be used from then on.

In the embodiment described hereinbefore three different recording strategies can be chosen from. Depending on the length deviations belonging to the I3 effects which have been recorded with one of the three recording strategies, either of the other recording strategies will be used hereinafter. However, it will be obvious to the expert that the number of different recording strategies from which a choice is to be made on the basis of the measure for the mutual differences in length deviations is not restricted to three, but rather is unlimited.

In the embodiment described hereinbefore the length deviation of the signal portions of the binary read signal V1' is used as a measure for mutual differences, which portions correspond to the I3 effects.

In practice, these I3 effects appear to be more sensitive to adaptations of the recording strategy than the longer effects. However, it will also be obvious that the mutual differences in length deviations can also be determined in other manners. For example, it is attractive to compare the length deviations belonging to effects that are relatively sensitive to recording strategy adaptations with length deviations belonging to effects that are relatively insensitive to recording strategy adaptations.

Generally, the length deviations belonging to the shortest effects differ most from the length deviations belonging to the other effects. However, there are recording layers for which the length deviations belonging to the longer effects show the largest length deviation. It will be obvious that in such recording layers the correctness of the recording strategy can be determined best on the basis of the length deviations belonging to these longer effects.

Figure 1:
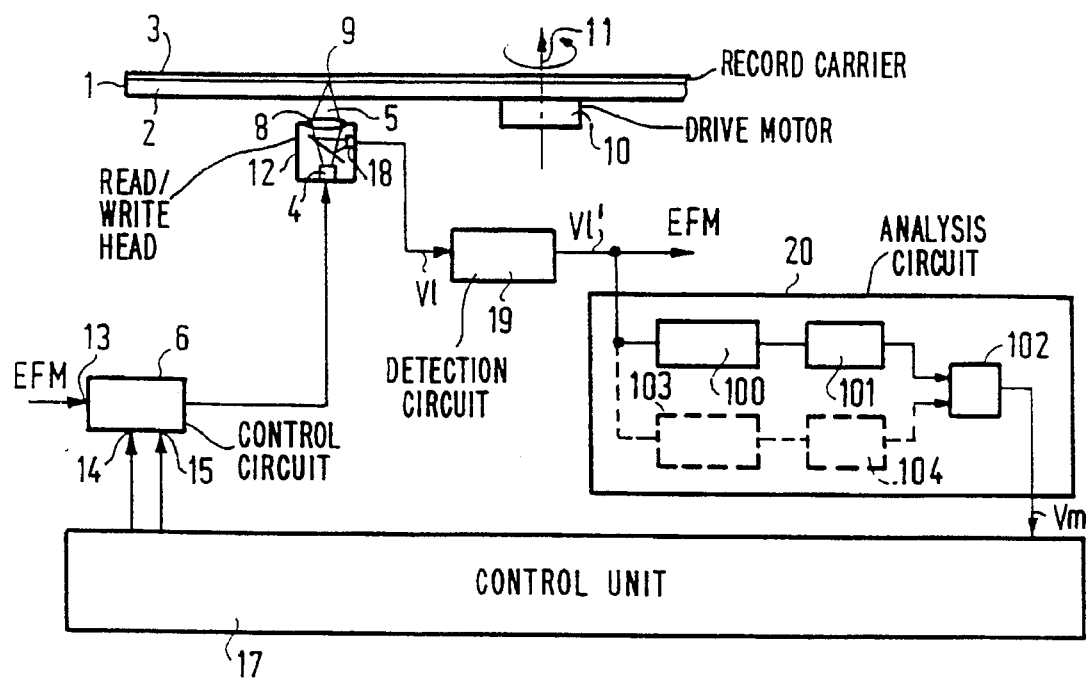
FIG. 1 shows an embodiment of a recording device according to the invention.

FIG. 1 shows an embodiment of a recording device in which the recording strategy corresponding to a method according to the invention is adapted. In that figure a disc-like record carrier is referenced 1. The record carrier 1 comprises a transparent substrate 2 on which a recording layer 3 of a customary type is deposited in which optically detectable effects can be realised by subjecting this layer to radiation pulses having a sufficiently high power level to cause an optically detectable change to take place in the recording layer 3.

The record carrier 1 is driven in a rotary fashion around an axis 11 by means of a drive motor 10. An optical read/write head 12 is positioned opposite the rotating record carrier 1. The head 12 comprises a radiation source 4 for generating a radiation beam 5 which is focused at the recording layer 3 by an optical system, the radiation beam being focused at a small scanning spot 9 on the recording layer 3 by a focusing unit 8 included in the optical system. The radiation source 4 is energized by a control signal. The intensity of the generated radiation beam is determined by the power of the control signal. The control signal is generated by a control circuit 6 of a customary type. The control circuit 6 receives an EFM-modulated signal on an information input 13. A setting signal which indicates the recording strategy to be used is received on a control input 14 of control circuit 6. The power of the control signal coming from the control circuit 6 and applied to the radiation source 4 corresponds to that of the received EFM-modulated signal, which has been modulated with the recording strategy, this strategy being determined by the signal received on the set input 14. In addition to the recording strategies shown in FIG. 2 numerous other recording strategies are suitable. Suitable recording strategies and dedicated control circuits are known, for example, from U.S. Pat. No. 4,774,522 DE-A-37.27.681, U.S. Pat. No. 4,646,103, EP-A 0.317.193 and EP-A 0.288.114, which documents are incorporated herein by reference.

The control circuit 6 further has a read/write control input 15 by which the control circuit 6 may be brought to a read state or write state. In the write state the control circuit 6 applies a power-modulated control signal to the radiation source as described hereinbefore. As a result of this power-modulated control signal, the radiation source 4 generates a radiation beam whose intensity is alternately switched between a high level at which there is an optically detectable change in the recording layer 3, and a low level at which there is no optically detectable change in the recording layer 3.

In the read state the control circuit 6 applies to the radiation source 4 a control signal of a constant, low power level for which the intensity of the radiation beam adopts a value at which there is no optically detectable change in the recording layer 3.

For setting the recording strategy and selecting the read or write state, the inputs 14 and 15 of the control circuit are coupled to a control unit 17, for example, a control unit of a customary programmable type containing appropriate software.

For determining the correctness of the recording strategy used, the control circuit 6 is brought to the write state by the control unit 17, as a result of which a pattern of effects 32 and gaps 33 which corresponds to a received EFM-modulated signal is recorded in the recording layer 3. Subsequently, the control circuit 6 is brought to the read state and, under the control of the control unit, the recorded pattern is scanned with low intensity by the radiation beam 5. The radiation beam reflected by the recording layer 3 presents a modulation corresponding to the scanned pattern. For the detection of this beam modulation the reflected radiation beam is directed to a radiation-sensitive detector 18 of a customary type which produces the read signal V1 that corresponds to the scanned pattern. The read signal V1 is converted into the binary detection signal V1' in a detection circuit 19 by a comparison with the reference level Vref. For a detailed description of an embodiment for the detection circuit 19, reference is made, for example, to GB-A2.109.187 which document is incorporated herein by reference. The binary read signal V1' is applied to an analysis circuit 20 which derives therefrom the quality signal Vm which is a measure of the mutual differences in the length deviation. The quality signal Vm is applied to the control unit 17 which establishes, on the basis of a suitable decision criterion, whether the recording strategy used is correct. If it is not correct, a determination is made, on the basis of the quality signal, in which manner the recording strategy is to be adapted and, accordingly, a signal is applied to the set input of the control circuit 6 for that purpose.

Figure 8:
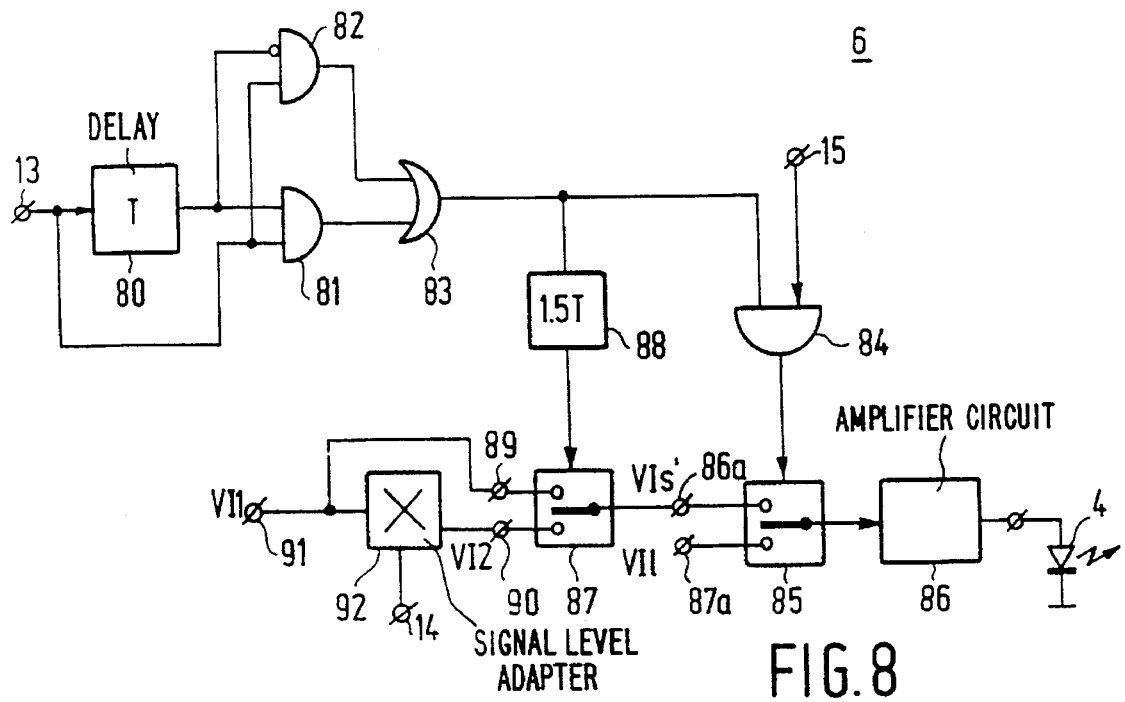
FIG. 8 shows an embodiment of a control circuit to be used a recording device according to the invention.

FIG. 8 shows an embodiment for the control circuit 6 by which effects can be recorded while one of the recording strategies shown in FIG. 2 is used.

The control circuit 6 in FIG. 8 comprises a delay element 80, an input of which is coupled to the information input 13 to receive the EFM-modulated signal. The delay element 80 delays the signal received on its input by a period of time corresponding to the length of a bit cell of the EFM-modulated signal. The signal delayed by the delay element is applied to an input of a double-input AND gate 81. The other input of the AND gate 81 is supplied with the EFM-modulated signal received through input 13. The EFM-modulated signal is also applied to a non-inverting input of a double-input AND gate 82. The other (inverting) input of the AND gate 82 is supplied with the output signal of the delay element 80. The output of the AND gate 82 is applied to an input of an OR gate 83. Another input of the OR gate 83 is supplied with the output signal of the AND gate 81. The output signal of the AND gate 81 adopts the logic "1" value if both the EFM-modulated signal and the EFM-modulated signal delayed by one bit cell length have the value "1". This means that in the case where the EFM-modulated signal presents n successive bit cells having the logic "1" value, a series of n–2 successive bit cells having the logic "1" value will be presented on the output of the AND gate 81. When the first bit cell of the series of n successive bit cells is received on input 13, a logic "1" is presented at the output of AND gate 82. The outputs of the two AND gates 81 and 82 are applied to the OR gate 83, so that a series of n–1 bit cells having the logic "1" value are presented at the output of the OR gate 83. The output of the OR gate 83 is applied to a control input of a switch 85 through an AND gate 84. A second input of the AND gate 84 is connected to the read/write control input 15. If the signal received on the input 15 has a logic "1" value, the control circuit is in the write state and an output of the switch 85 is alternately connected to an input 86a and an input 87a depending on the signal supplied by the OR gate 83. The input 86a is supplied with the signal VIs' which denotes the write intensity of the radiation beam. The input 87a is supplied with the signal VI1 which denotes the read intensity of the radiation beam. The output of the switch 85 is applied to an amplifier circuit 86 which derives, in response thereto, the control signal for the radiation source 4, so that the intensity of the radiation beam generated by the radiation source 4 is switched between the intensity values denoted by the signals VIs' and VI1 according to a switch pattern determined by the output signal of the OR gate 85.

In the recording strategies shown in FIG. 2 the recording intensity adopts the value I1 for a period of time of 1.5 T at the beginning of each radiation pulse. For the rest of the radiation pulse the intensity adopts a value I2. For realising such an intensity pattern, the control circuit 6 comprises a switch 87. The switch 87 is controlled by an output of a flip-flop 88 whose input is connected to the output of the OR gate 83 and is dimensioned in such a way that a logic "1" signal is presented at the control input of the switch 87 in response to a "0"–"1" transition in the output signal of the OR gate 83 for a period of time 1.5 times the bit cell length. The switch 87 is of a type which connects one (89) of its inputs to its output in response to an "1" signal on its control input. In response to a "0" signal another one (90) of its inputs is connected to its output. The input 89 of the switch 87 is supplied with a signal VI1 received through an input 91 and which denotes the intensity level I1. A signal VI2 which denotes the intensity level I2 is presented at the output 90. Signal VI2 is derived from the signal VI1 by means of a signal level adapter 92. For this purpose, an input of the signal level adapter is coupled to the input 91. Another input of the signal level adapter 92 is coupled to the set input 14. The signal level adapter is of a customary type which produces on its output a signal which has a signal level amounting to a specific percentage of the signal VI1 received on the input 91, which percentage is determined by the set signal received on input 14. In the case where the control circuit 6 is arranged for causing signals to be recorded according to the recording strategies as they are shown in FIG. 2, this percentage is set at 80%, 70%, or 100% depending on the set signal received on input 14.

The output signal of the switch 87 is applied as signal VIs' to the input 86a of the switch 85, so that the intensity variation shows the desired behaviour as shown in FIG. 2.

It will be obvious that the invention is not restricted to the use of the control circuit as shown in FIG. 8. Alternatively, it is possible to use a control circuit in which each possible recording strategy has its own derived control signal and in which one of the control signals is selected and applied to the radiation source in response to the set signals received on the set input 14.

Figure 9:
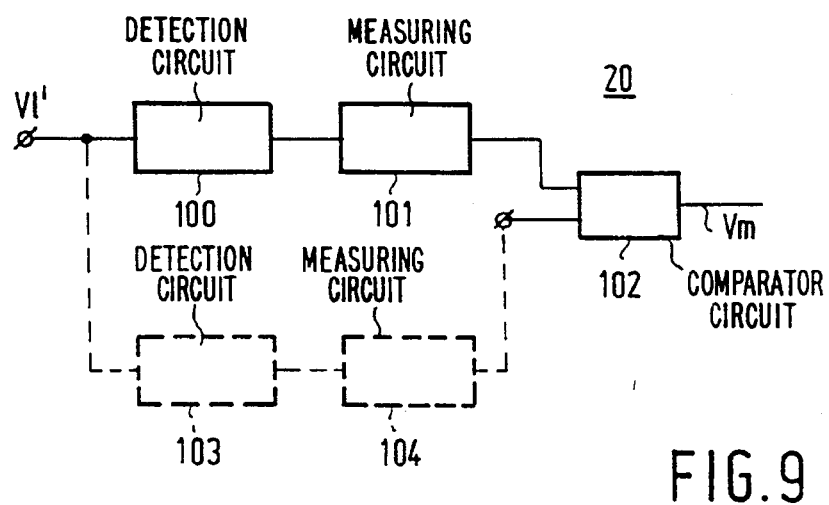
FIG. 9 shows an analysis circuit to be used in a recording device according to the invention.

FIG. 9 shows a possible embodiment for the analysis circuit 20 for deriving the quality signal Vm from the binary read signal V1'. The analysis circuit 20 comprises a detection circuit 100 for separating from the read signal the read signal portions that represent the effects which are relatively sensitive to the adaptation of the recording strategy. In this embodiment they are the read signal portions that represent the I3 effects. The length of the separated read signal portions is determined with the aid of a measuring circuit 101. The measuring circuit 101 applies a signal to a comparator circuit 102 which signal represents the average length of the separated read signal portions. The comparator circuit 102 compares the average length determined by the measuring circuit 101 with a reference length equal to three times the bit cell length T. The quality signal produced by the comparator circuit 101 denotes the difference between the determined average length of the separated signal portions and the reference length. The reference length may also have a fixed set value. However, the reference length is preferably derived from the read signal V1'.

A circuit by which the reference length can be derived from the read signal is shown in FIG. 9 in a dashed line. This circuit comprises a detection circuit 103 for separating read signal portions which are rather insensitive to adaptations of the recording strategy. In this embodiment they are the read signal portions that represent the I6 effects. The length of the read signal portions separated by the detection circuit 103 is determined by a measuring circuit 104. The measuring circuit 104 derives the reference length from the average value of the lengths of the separated read signal portions.

In the recording strategies shown in FIG. 2 the intensity at the beginning of the radiation pulse is equal to I1. This value may be different for different recording layers. In order to cause the initial intensity in the recording strategy to be set to the right value, it is possible, for example to pre-record information representing this value I1 on the record carrier. However, it is alternatively possible to determine this value by means of a calibration procedure which is carried out prior to the actual recording. Embodiments for such calibration procedures are extensively described in EP-A-0,404,251, which document is incorporated herein by reference. That document also describes how during the recording operation the value of I1 can be adapted in response to the intensity behaviour of the reflected radiation beam at the beginning of each radiation pulse.

A measure is then determined from the behaviour of the reflected radiation beam and it denotes the speed with which the effect is formed. This measure is compared with a reference value determined, for example, during the calibration procedure. Depending on the difference between the measurement found and the reference value, the intensity is adapted at the beginning of the radiation pulse.

Figure 10:
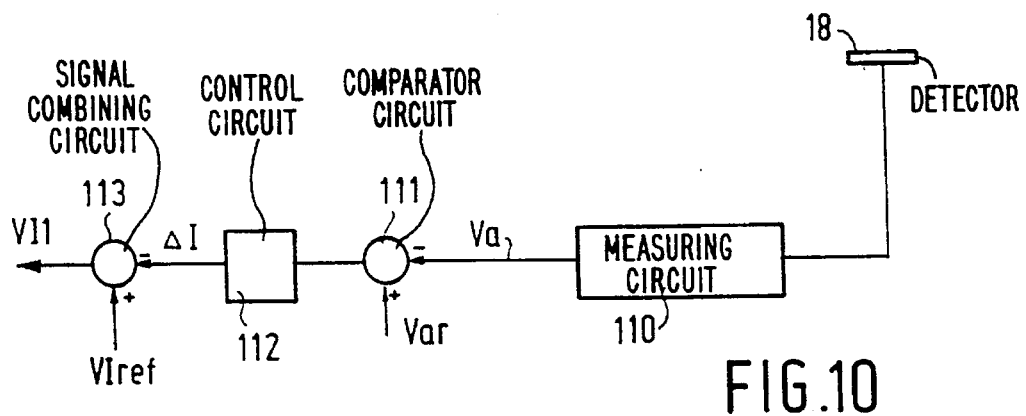
FIG. 10 shows an embodiment for a circuit for controlling the initial intensity of radiation pulses used in a recording strategy.

FIG. 10 shows an embodiment for a circuit for adapting the signal VI1 as a function of a signal Va which denotes with what speed an effect is formed. The circuit comprises a measuring circuit 110 for deriving the signal Va from the signal produced by the detector 18 during the formation of the effects. For a detailed description of the measuring circuit 110 reference is made to EP-A-0,404,251. In a comparator circuit 111 the signal Va is compared with a reference signal Var. The comparator circuit 111 produces an output signal which is indicative of the result of the comparison. This output signal is applied to a control circuit 112 which is of an integrating type. The output signal of the control circuit 112 and a reference value VIref are combined to the signal VI1 by a signal combining circuit 113.

Figure 11:
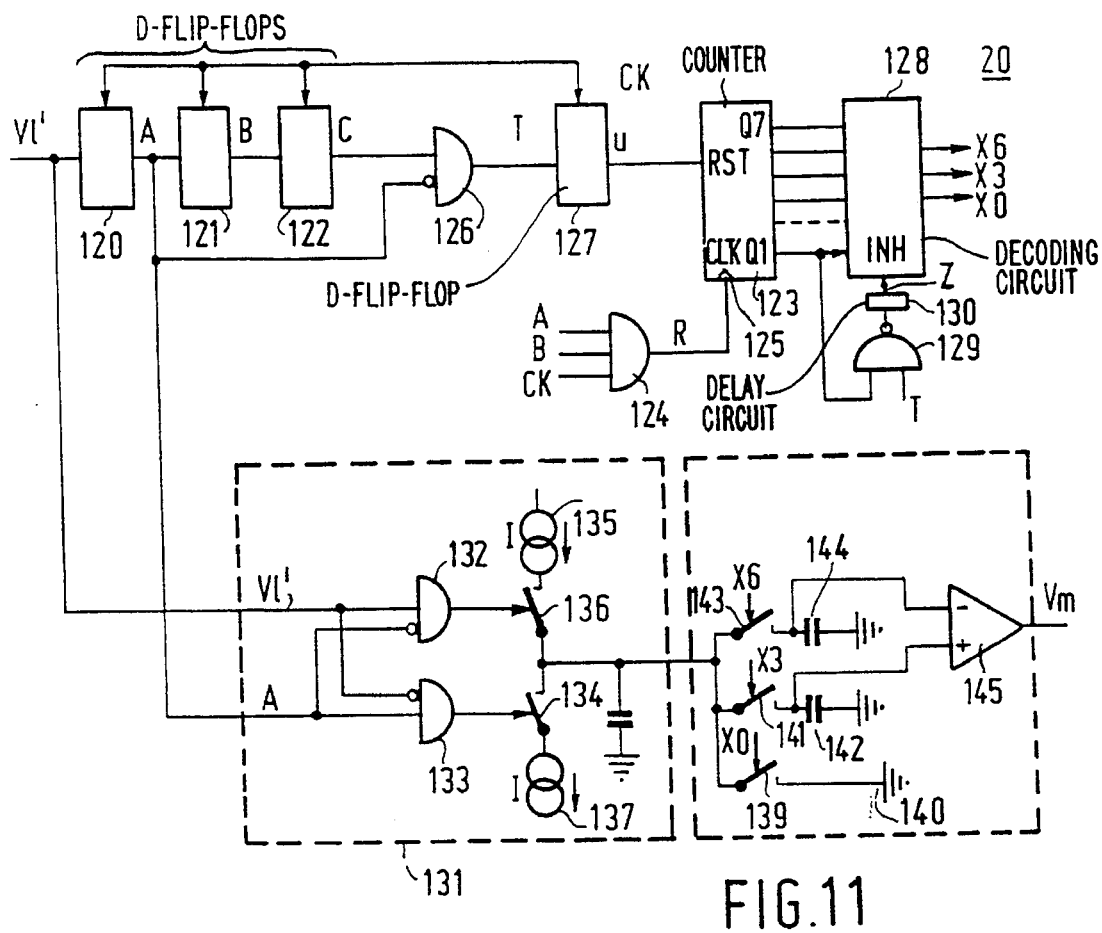
FIG. 11 shows a further embodiment for an analysis circuit according to the invention.

FIG. 11 shows yet another embodiment for the analysis circuit 20 for deriving the quality signal for EFM-modulated signals.

The analysis circuit 20 is supplied with a reference clock signal CK whose frequency is equal to twice the bit frequency of the binary read signal V1'. The clock signal CK is generated with an idling oscillator (not shown). Idling in this context is meant to be understood as the clock signal not being in synchronism with binary read signal V1'.

Figure 12:
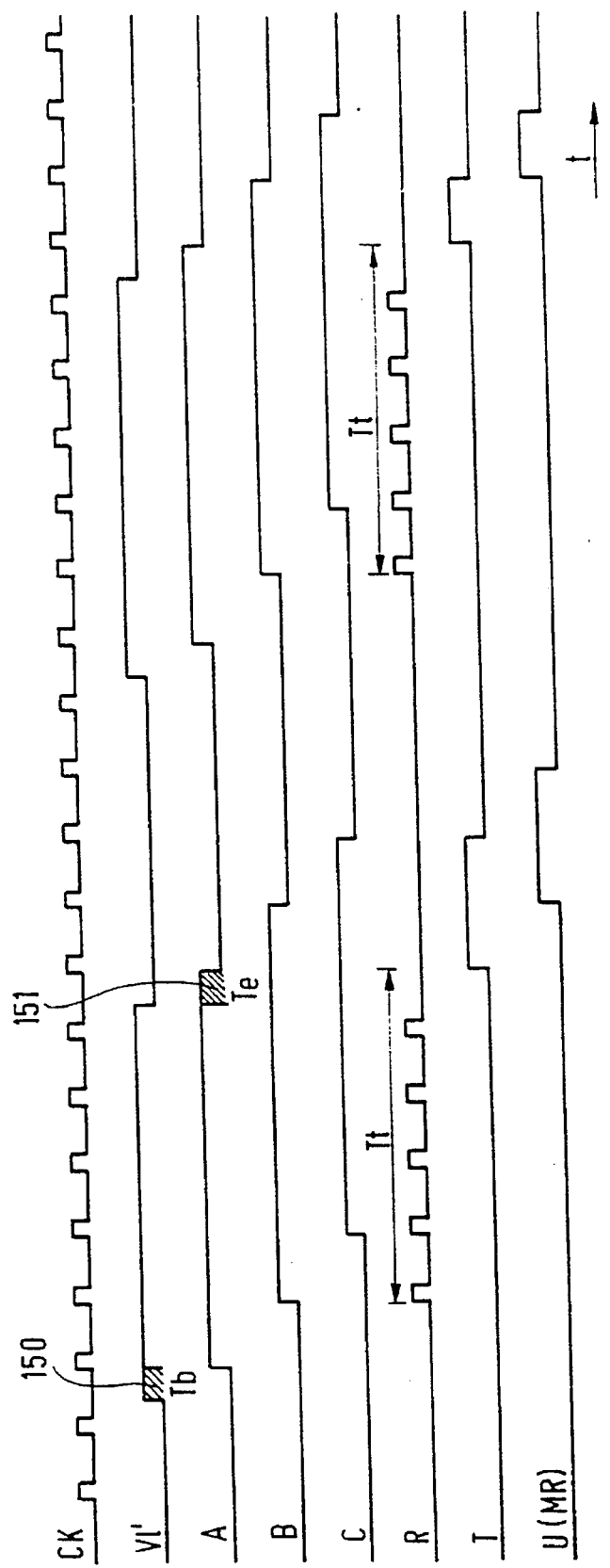
FIG. 12 shows a plurality of signals found in the analysis circuit shown in FIG. 11.

The binary read signal V1' is delayed by a cascade combination of three D-flip-flops 120, 121 and 122 controlled by the clock signal CK, by one, two and three clock periods T,respectively, of clock signal CK. The delayed signals are referenced A, B being delayed and C, signal A being delayed by one clock period T, signal B by two clock periods T and signal C being delayed by three clock periods T. The binary read signal V1' as well as the derived signals A, B and C are shown in FIG. 12 plotted against time t.

An AND gate 124, whose inputs are supplied with the signals A and B and clock signal CK, transfers the clock signal CK to a count input 125 of a counter 123 during a count interval Tt in which both the signal A and the count signal B adopt the logic "1" value. The output signal of the AND gate 124 is referenced R. In the time intervals situated between the count intervals Tt the count is zeroed by a signal U. The signal U is derived from the delayed signals A and C by an AND gate 126 and a D-flip-flop 127. The signal A is then applied to an inverting input of AND gate 126 and the signal C to a non-inverting input of the AND gate 126. The output signal of the AND gate 126 is referenced T. This signal T is delayed by one clock period by the D-flip-flop controlled by the clock signal CK. The delayed signal at the output of the D-flip-flop 127 is the signal U which is used for setting the count of the counter 123 to zero.

The counter 123 always counts the number of clock pulses CK generated in time interval Tt. This number is indicative of the number (n) of successive bit cells having the logic "1" value in the binary read signal V1'.

In FIG. 13 the relationship between the count CO and the number of bit cells is shown. Q1, Q2, Q3, Q4 and Q5 represent the bits of the count, Q1 denoting the least significant bit and Q5 denoting the most significant bit. It is to be noted that the counts for which the least significant bit Q1 is "0", do not unambiguously indicate the number n.

The bits Q1 ... Q5 representing the count CO are applied to a decoding circuit 128 which has three outputs for supplying a signal X0, X3 and X6. The signal X0 denotes that the count CO is equal to zero, X3 denotes that the count CO is a read signal portion of V1' which is 3 bit cells in length, X6 denotes that the count CO represents a read signal portion of V1' which is 6 bit cells in length. The decoding circuit 128 comprises a what is commonly referred to as inhibit input INH which inhibits the presentation of signals X0, X3 and X6. Input INH is supplied with a signal Z which is derived from the least significant bit Q1 at the output of the counter 123 and the signal T by means of AND gate 129 which has an inverting output. The output signal of the AND gate 129 is delayed by a delay circuit 130 over a brief period of time which is a fraction of the period of time T. The delayed signal at the output of the delay circuit 130 forms the signal Z.

The signals X0, X3 and X6 at the output of the decoding circuit 128 are derived in the following manner. AND gate 124 transfers the clock signal CK during the time interval Tt. The transferred clock pulses are counted. If the counter CO is unequivocally the number of successive bit cells (Q1= "1"), subsequent to the time interval Tt the signal Z on the INH input of the decoding circuit 128 becomes equal to "0" in response to signal T. As a result, the decoding circuit 128 is no longer inhibited. In the case where the count is equal to "5", the signal X3 is presented during the active period of the decoding circuit. In the case where the count is equal to "11", the signal X6 is presented during the active period of the decoding circuit 128. A clock period after the signal T has adopted the logic "1" value, the signal U will turn "1" and the counter 123 will be set to zero by the signal U. The count then becomes equal to "0". This means that the least significant bit Q1 becomes "0", so that the signal Z turns "1" again and the decoding circuit 128 becomes inoperative.

Since the signal Z is applied via the delay circuit 130, the decoding circuit 128 is rendered inoperative one time interval after the counter 123 has been set to zero, which time interval corresponds to the delay period. During this time interval the signal X0 is generated.

Summarizing: if the number of successive bit cells having the "1" value in the binary read signal V1' is equal to "3", the signal X3 is generated for a brief period of time of about one clock period at the output of the decoding circuit 128. The generation of the signal X3 is immediately followed by a generation of the signal X0. The generation of the signals X3 and X0 is effected in a time interval in which the binary read signal V1' is "0". Similarly, in the case where the binary read signal V1' comprises 6 bit cells, the signal X6 and the signal X0 are successively generated in the time interval during which the binary read signal V1' is "0" again.

In FIG. 11 the part of the circuit shown in box 13 1 is used for determining the length deviation. The circuit comprises two AND gates 131 and 132 which each have an inverting and non-inverting input.

The binary read signal V1' is applied to the non-inverting input of AND gate 132 and the inverting input of AND gate 133. The signal A delayed relative to signal V1' is applied to the inverting input of AND gate 132 and the non-inverting input of AND gate 133. The output signal of AND gate 132 adopts a "1" value at the beginning of each series of bit cells which have a logic "1" value in the binary read signal V1'.

In FIG. 12 this part of the beginning of V1' is shown as a shaded portion 150, having length Th. The output signal of AND gate 133 adopts the "1" value at the end of the time interval when the signal A adopts the "1" value.

In FIG. 12 this part of signal A in which the output signal of AND gate 133 adopts the "1" value is shown by a shaded portion 151, having length Te.

The difference of length between part 150 and part 15 1 denotes the extent of the length deviation. To determine this difference the circuit comprises a capacitor 134. During the time Tb a switch 136 controlled by the AND gate 132 connects the capacitor 134 to a current source 135 which current source charges capacitor 134 with a current I.

During the period of time Te a switch 138 controlled by the AND gate 133 connects a current source 137 to the capacitor which current source withdraws a current I from the capacitor. The consequential change of voltage across the capacitor 134 is a measure for the time difference Tb–Te and thus a measure for the length deviation.

The capacitor 134 is connected through a switch 139 controlled by the signal X0 to a point of constant potential 140. The capacitor 134 is further connected to a capacitor 142 through a switch 141 controlled by the signal X3, and to a capacitor 144 through a switch 143 controlled by the signal X6. The capacitance of the capacitors 142 and 144 is selected to be many times as large as the capacitance of the capacitor 134.

In all the cases where the binary read signal V1' has become zero again, the switch 139 is controlled by the signal X0, so that the capacitor voltage is made equal to the voltage of point 140. Then the length deviation of the next signal portion having the "1" value of the binary read signal V1' is measured by the capacitor 134. If it is detected that the length for which the length deviation is determined corresponds to three times the bit cell length, the switch 14 1 is closed under the influence of signal X3 and the capacitors 134 and 142 are temporarily connected in parallel.

If the length of the signal portion whose length deviation has been determined corresponds to 6 times the cell length, switch 143 is closed in response to signal X6 and the capacitors 134 and 144 are temporarily connected in parallel. As a result of the capacitors being connected in parallel, the voltage across the capacitor 144 will adopt a value which is a linear combination of the voltages across the capacitors 134 and 144 for the parallel combination. Since the capacitance of the capacitor 144 is selected to be many times as large as that of the capacitor 134, the voltage the capacitor 144 had prior to the inclusion in the parallel combination contributes considerably more to the voltage obtained from the parallel combination than the voltage the capacitor 134 had prior to the inclusion in the parallel combination. For that matter, the voltage across capacitor 144 will adopt a value corresponding to the average length deviation for the signal portions that correspond to 3 bit cells. The voltage across the capacitor 142 will adopt a value corresponding to the average length deviation for the signal portions that correspond to 6 bit cells.

The quality signal Vm which represents the difference between the average length deviation shown by the voltage across capacitor 142 and the average length deviation shown by the voltage across the capacitor 144 is determined by a differential amplifier 145.

In the embodiment of the analysis circuit shown in FIG. 11 the length deviation is determined for the read signal portions that correspond to the length of 3 bit cells (i.e., I3 effects) and that correspond to the length of 6 bit cells (i.e., I6 effects). It will be obvious that the average length deviation for read signal portions that correspond to the length of a different number of bit cells may be obtained similarly.

Figure 14:
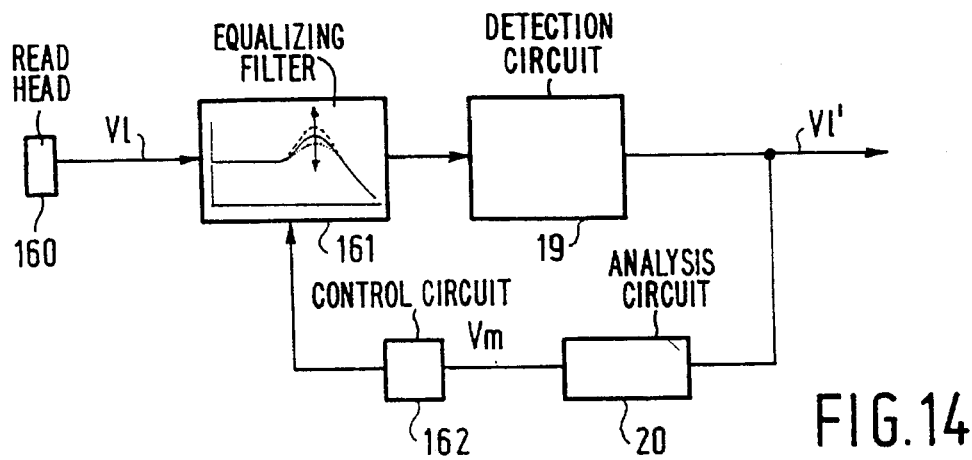
FIG. 14 shows a reading device according to the invention.
Figure 15:
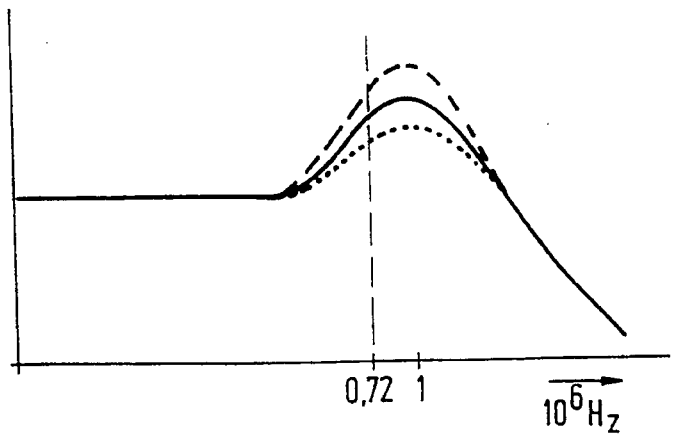
FIG. 15 shows a transfer characteristic of an equalizing filter suitable for use in a reading device according to the invention.

FIG. 14 shows another implementation of the invention. This implementation relates to a reading device. Reference 160 denotes an optical read head of a customary type which produces a read signal V1. The read signal V1 is applied to an equalizing filter 161 which emphasizes the frequency components in the high-frequency region of the read signal spectrum. When information patterns are optically read out, as is done with information patterns realised on a Compact Disc, the frequencies to be emphasized are of the order of 1 MHz. FIG. 15 shows by way of illustration the frequency characteristic of an equalizing filter which is customarily used for reading a Compact Disc. The frequency corresponding to the I3 effects is approximately equal to 0.72 MHz.

By emphasizing the higher frequencies, a compensation is provided for the falling of the reading frequency characteristic (alternatively called MTF characteristic) as occurs with optical reading. This emphasizing of the higher frequencies results in the length deviations in the read signal portions that correspond to the shorter effects, especially the I3 effects, being reduced.

The read signal filtered by the equalizing filter 161 is converted into the binary read signal V1' by the detection circuit 19. The analysis circuit 20 derives the quality signal Vm from the signal V1'. The quality signal Vm denotes to what extent the length deviations of the read signal portions that correspond to short effects are different. The signal V m is applied to a control circuit 162 for setting the extent to which the higher frequencies are emphasized by the equalizing filter 161. The extent to which the higher frequencies are emphasized is set to a value for which the quality signal Vm denotes that the length deviations of the read signal portions that correspond to the short effects are small.

The adaptation of the equalizing filter 16 can be realized by adapting the gain factor for the higher frequencies while maintaining the gain factor for lower frequencies. However, adaptation of the gain factor for the lower frequencies while maintaining the gain factors for the higher frequencies is alternatively possible. It is only essential that the ratio between the gain factors of the higher frequencies and those of the lower frequencies be adapted as a function of the quality signal.

We claim:

1. A method of deriving a quality signal which is indicative of the quality of a read signal having constant-length bit cells, which bit cells individually have a first or a second logic value, the method comprising:

obtaining the read signal by reading an information pattern of optically detectable effects which represent groups of successive bit cells having the first logic value, in which first read signal portions of the read signal exceeding a reference value correspond to the effects; and deriving the quality signal on the basis of the first read signal portions, such derivation involving determining a first measure of first length deviation between lengths of the first read signal portions which represent groups of n successive bit cells and n times the bit cell length, where n is a value such that sensitivity of the length deviation for the value of n to certain parameter changes is relatively large in comparison with sensitivity of the first length deviation for other values of n to the parameter changes.

2. The method as claimed in claim 1, wherein the derivation of the quality signal further involves determining a second measure of second length deviation between lengths of the first read signal portions which represent groups of m successive bit cells and m times the bit cell length, where m is a value such that sensitivity of the second length deviation for the value of m to the parameter changes is relatively small in comparison with sensitivity of the second length deviation for other values of m to the parameter changes, and the quality signal is indicative of a difference between the first and second measures.

3. The method as claimed in claim 2, wherein the value of n is equal to 3 and the value of m is greater than or equal to 5 and smaller than or equal to 7.

4. A recording device for recording in a recording layer an information signal having constant-length bit cells, which bit cells individually have a first or a second logic value, the device comprising:

scanning means for scanning the recording layer with a radiation beam having an intensity, and modulation means for modulating the intensity of the radiation beam on the basis of the information signal while a certain recording strategy is followed, such scanning and modulation resulting in an information pattern of optically detectable effects being recorded in the recording layer, which effects represent groups of successive bit cells having the first logic value:

reading means for reading the information pattern and generating a read signal therefrom in which first read signal portions exceeding a reference value in correspond to the effects;

analysis means for analyzing the first read signal portions to produce a quality signal which is indicative of the quality of the read signal, the analysis means including first determining means for determining a first measure of first length deviation between lengths of the first read signal portions which represent groups of n successive bit cells and n times the bit cell length, where n is a value such that sensitivity of the first length deviation for the value of n to changes in the recording strategy is relatively large in comparison with sensitivity of the first length deviation for other values of n to the changes in the recording strategy; and adapting means for adapting the recording strategy on the basis of the quality signal.

5. The device as claimed in claim 4, wherein the analysis means further includes second determining means for determining a second measure of second length deviation between lengths of the first read signal portions which represent groups of m successive bit cells and m times the bit cell length, where m is a value such that sensitivity of the second length deviation for the value of m to the changes in the recording strategy is relatively small in comparison with sensitivity of the second length deviation for other values of m to the changes in the recording strategy; and third determining means for determining a difference between the first and second measures, the quality signal being indicative of the difference.

6. The device as claimed in claim 5, wherein the value of n is equal to 3 and the value of m is greater than or equal to 5 and smaller than or equal to 7.

7. The device as claimed in claim 4, wherein the modulation means includes means for performing a recording strategy according to which the intensity of the radiation beam is modulated in a pulsed manner to produce radiation pulses; the adapting means is adapted for adapting the intensity of the radiation pulses during a time interval which begins a predetermined period of time subsequent to the beginning of each of the radiation pulses; and the device further comprises setting means for setting the reference value at a value in which an average length of the first read signal portions is substantially equal to an average length of second read signal portions of the read signal which are located between the first read signal portions.

8. The device as claimed in claim 7, wherein the device further comprises detection means for detecting radiation reflected by the recording layer during recording; and setting means for setting the intensity of the radiation beam at the beginning of each radiation pulse in dependence on the radiation reflected during the beginning of the radiation pulses but prior to the corresponding intervals which begin a predetermined period of time subsequent to the beginning of each of the radiation pulses.

9. A reading device for reading an information pattern from a recording layer, which information pattern represents an information signal having constant-length bit cells, which bit cells individually have a first or a second logic value, the information pattern having optically detectable effects which represent groups of successive bit cells having the first logic value, the device comprising:

reading means for reading the information pattern and generating a read signal therefrom in which first read signal portions of the read signal exceeding a reference value correspond to the effects;

filter means for filtering the read signal, in which filter means a ratio between a gain factor of the first read signal portions in a specific frequency range and a gain factor of the first read signal portions outside that frequency range is adaptable;

analysis means for determining a quality signal on the basis of a first measure of first length deviation between lengths of the first read signal portions which represent groups of n successive bit cells and n times the bit cell length, where n is a value at which the frequency of the first read signal portions which represent groups of n successive bits cells lies in the frequency range; and adapting means for adapting the ratio between the gain factors in dependence on the quality signal.

10. The device as claimed in claim 9, wherein the analysis means determines (a) the first measure, (b) a second measure of second length deviation between lengths of the first read signal portions which represent bit groups of m successive bit cells, where m is a value at which the frequency of the first read signal portions which represent groups of m successive bits cells lies outside the frequency range, and (c) a difference between the first and second measures, the quality signal being indicative of the difference.

11. The device as claimed in claim 10, wherein the value of n is equal to 3 and the value of m is greater than or equal to 5 and smaller than or equal to 7.

12. The device as claimed in claim 5, wherein the modulation means includes means for performing a recording strategy according to which the intensity of the radiation beam is modulated in a pulsed manner to produce radiation pulses; the adapting means is adapted for adapting the intensity of the radiation pulses during a time interval which begins a predetermined period of time subsequent to the beginning of each of the radiation pulses; and the device further comprises setting means for setting the reference value at a value in which an average length of the first read signal portions is substantially equal to an average length of second read signal portions of the read signal which are located between the first read signal portions.

13. The device as claimed in claim 12, wherein the device further comprises detection means for detecting radiation reflected by the recording layer during recording; and setting means for setting the intensity of the radiation beam at the beginning of each radiation pulse in dependence on the radiation reflected during the beginning of the radiation pulses but prior to the corresponding intervals which begin a predetermined period of time subsequent to the beginning of each of the radiation pulses.

14. The device as claimed in claim 6, wherein the modulation means includes means for performing a recording strategy according to which the intensity of the radiation beam is modulated in a pulsed manner to produce radiation pulses; the adapting means is adapted for adapting the intensity of the radiation pulses during a time interval which begins a predetermined period of time subsequent to the beginning of each of the radiation pulses; and the device further comprises setting means for setting the reference value at a value in which an average length of the first read signal portions is substantially equal to an average length of second read signal portions of the read signal which are located between the first read signal portions.

15. The device as claimed in claim 14, wherein the device further comprises detection means for detecting radiation reflected by the recording layer during recording; and setting means for setting the intensity of the radiation beam at the beginning of each radiation pulse in dependence on the radiation reflected during the beginning of the radiation pulses but prior to the corresponding intervals which begin a predetermined period of time subsequent to the beginning of each of the radiation pulses.

16. The method as claimed in claim 1, wherein the quality signal is indicative of the first measure.

17. The recording device as claimed in claim 4, wherein the quality signal is indicative of the first measure.

18. The reading device as claimed in claim 9, wherein the quality signal is indicative of the first measure.

19. A method of deriving a quality signal which is indicative of the quality of a read signal having constant-length bit cells, which bit cells individually have a first or a second logic value, the method comprising:

obtaining the read signal by reading an information pattern of optically detectable effects which represent groups of successive bit cells having the first logic value, in which first read signal portions of the read signal exceeding a reference value correspond to the effects; and deriving the quality signal by obtaining a length deviation between an average of lengths of the first read signal portions which represent groups of n successive bit cells and a reference length, where n is a value such that sensitivity of the length deviation for the value of n to certain parameter changes is relatively large in comparison with sensitivity of the length deviation for other values of n to the parameter changes.

20. The method as claimed in claim 1, wherein the reference length is n times the bit cell length.

21. The method as claimed in claim 19, wherein the reference length is derived from an average of lengths of the first read signal portions which represent groups of m successive bit cells, where the value of m is one of the other values for n.

22. A reading and/or recording device for reading and/or recording an information pattern on and/or from a recording layer, which information pattern represents an information signal having constant-length bit cells, which bit cells individually have a first or a second logic value, the information pattern having optically detectable effects which represent groups of successive bit cells having the first logic value, the device comprising:

reading means for reading the information pattern and generating a read signal therefrom in which first read signal portions of the read signal exceeding a reference value correspond to the effects; and analysis means for deriving a quality signal which is indicative of quality of the read signal by obtaining a length deviation between an average of lengths of the first read signal portions which represent groups of n successive bit cells and a reference length, where n is a value such that sensitivity of the length deviation for the value of n to certain parameter changes is relatively large in comparison with sensitivity of the length deviation for other values of n to the parameter changes.

23. The device as claimed in claim 22, wherein the analysis means includes a measuring means for obtaining the average of the lengths of the first read signal portions which represent groups of n successive bit cells; and comparator means for determining the length deviation.

24. The device as claimed in claim 23, wherein the comparator means determines the length deviation by comparing the average of the lengths of the first read signal portions which represent groups of n successive bit cells to n times the bit cell length.

25. The device as claimed in claim 22, wherein the analysis means includes a first measuring means for obtaining the average of the lengths of the first read signal portions which represent groups of n successive bit cells; a second measuring means for obtaining an average of lengths of the first read signal portions which represent groups of m successive bit cells for use in deriving the reference length, where the value of m is one of the other values for n; and comparator means for determining the length deviation.

* * * * *